Dec. 15, 1925.

O. W. HEISE 1,565,447

DAMPENING DEVICE FOR PRESSURE GAUGES

Filed March 30, 1922    2 Sheets-Sheet 1

INVENTOR
Otto W. Heise,
BY
Duell, Warfield & Duell.
ATTORNEY.

Dec. 15, 1925.  1,565,447

O. W. HEISE

DAMPENING DEVICE FOR PRESSURE GAUGES

Filed March 30, 1922   2 Sheets-Sheet 2

INVENTOR
Otto W. Heise,
BY
Daniel Warfield & Duell.
ATTORNEY

Patented Dec. 15, 1925.

1,565,447

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

DAMPENING DEVICE FOR PRESSURE GAUGES.

Application filed March 30, 1922. Serial No. 548,262.

*To all whom it may concern:*

Be it known that I, OTTO W. HEISE, a citizen of the United States, residing at Bridgeport, in the county of Fairfield and State of Connecticut, have invented certain new and useful Improvements in Dampening Devices for Pressure Gauges, of which the following is a full, clear, and exact description, such as will enable others skilled in the art to which it appertains to make and use the same.

This invention relates to indicating devices, and more particularly to visual indicators which have relatively movable members, for instance the co-operating dials and pointers of gauges.

This invention has for its general object an improved construction and arrangement of parts which is durable, economical, readily manufactured, and adapted to give accurate indications.

A more specific object of this invention is to improve the precision with which visual indications are given.

Another object is to provide a construction which renders the moving parts of the indicator substantially dead beat when subject to minor variations in the condition to be indicated.

Another object is to provide improved means for damping vibrations, and transient fluctuating motions in the moving parts of the indicator.

Still another object is to provide visual indicators designed to respond to major changes in a constantly disturbed condition (such as when pressure gauges are connected to pumps) with means for rendering them substantially unresponsive to the minor fluctuations, or to quick periodic changes in the condition indicated which are too rapid for the eye to discern.

Other objects of this invention will in part be hereinafter specifically pointed out and in part obvious from the arrangements and constructions here set forth.

The invention accordingly consists in the features of construction, combinations of elements and arrangement of parts which will be exemplified in the construction hereinafter set forth, and the scope of their application will appear in the appended claims.

For a more complete understanding of the nature and advantages of this invention reference should be had to the following detailed description, which describes the best illustrative embodiments of this invention at present known to me, taken in connection with the accompanying drawing in which.

Figure 1:
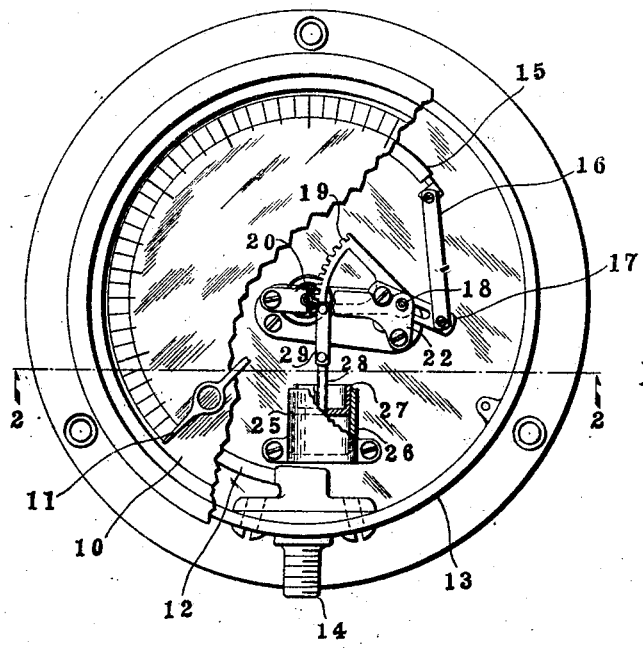
Figure 1 is a front elevation of the pressure gauge constructed in accordance with this invention, part being broken away in order better to show the means rendering it "anti-fluctuating," or unresponsive to minor fluctuations in pressure.
Figure 2:
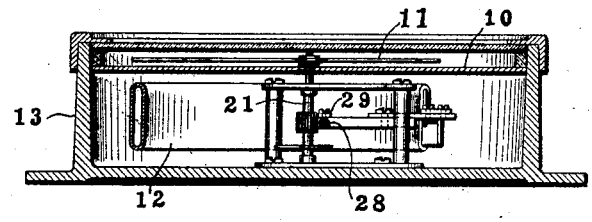
Fig. 2 is a sectional view taken on the line 2—2 (looking in the direction of the arrows) of Fig. 1.

Referring now to the drawings, and particularly Fig. 1, 10 designates the dial or stationary member with which the pointer or movable member 11 co-operates in order to indicate the condition of pressure to which the movements of the Bourdon tube 12 in the pressure gauge illustrated correspond. These relatively movable members 10 and 11 are preferably housed within the cylindrical casing shown at 13, which also supports the Bourdon tube or pressure responsive means 12; there being provided a nozzle 14 projecting through the casing wall in order to provide a connection from the Bourdon tube 12 to the source of pressure, the condition of which is to be indicated, the casing 13 is as usual filled with air so that the moving parts normally meet little opposition.

The Bourdon tube is shown mounted in the usual manner within the casing 13; so that as it dilates under the influence of pressure changes, its end 15 moves laterally, and has mechanical connections to the pointer 11 adapted to translate this dilating movement into an arcuate motion of the pointer 11 over the dial 10. This is conveniently effected by means of the link 16 which connects the end 15 to the motion multiplying lever 17 shown as pivotally mounted at 18 within the casing 13. This lever 17 obviously may translate the motion in any ratio from 1:1 up or down within reasonable limits and has at its other end a segment 19 which rotates the pinion 20 made fast to the spindle 21 carrying the pointer 11. These moving parts, as well as the bearing frame 22 supporting them, are preferably provided with wide bearing surfaces so that the gauge will be steady and have relatively long wearing qualities.

The arrangement however thus far described is adapted to cause the pointer 11 to move over the dial 10 and indicate changes in pressure communicated to the Bourdon tube with all the minor transient variations to which the pressure condition is subject. Should a vibration or rapidly fluctuating pressure be transmitted to the Bourdon tube, the end 15 will tend to vibrate, which motion will in turn be communicated to the pointer 11, thereby causing it to swing rapidly through a small arc over the dial. In order to damp out these vibrations, or cause the pointer to slowly take a position which is the average of these fluctuations the moving parts must have inertia. In the practice of this invention this is accomplished by the provision of positive means for damping the transmission of vibrations, or of transient fluctuating movements such transient movements from the Bourdon tube to the movable member or pointer 11, without increasing the mass of the parts. The provision of such positive means in the embodiment of the invention here illustrated is shown in the form of a dashpot device, as indicated at 25 in Fig. 1.

Figures 3, 4:
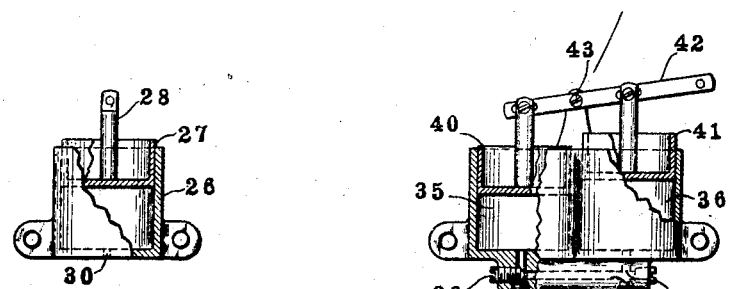
Fig. 3 shows details of a dashpot device comprising the means for rendering the pressure gauge shown in Fig. 1 "anti-fluctuating"
Fig. 4 shows details of a modified form of dashpot device.

The dashpot device of Fig. 1 is more clearly shown in Fig. 3, and comprises a small cylindrical chamber 26 adapted to be mounted within the casing 13 and provided with a closely fitting plunger or piston 27 which is mechanically connected through the rod 28 and link 29 with the rack portion 19 of the motion transmitting connection between the end 15 of the Bourdon tube and the pointer 11. The plunger 27 of the dashpot device shown in Fig. 3 is adapted to displace air as the buffer medium when it moves; accordingly a small orifice 30 is provided through the bottom of the chamber 26. In the arrangement shown in Fig. 1 it will be seen that the multiplying effect on the magnitude of the vibration transmitted from the end 15 of the Bourdon tube to the pointer 11 by reason of the use of a motion multiplying lever is offset by connecting the plunger 27 to the end of the rack 19 so as thereby to multiply the damping effect of the action of the dashpot device on the motion of the end 15 of the Bourdon tube.

Figure 7:
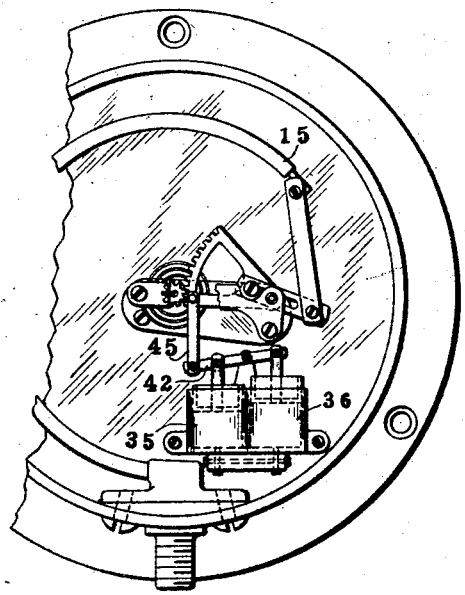

The dashpot device here employed to damp the fluctuating movements of the pressure-responsive element or Bourdon tube need not however be limited to the employment of air as the buffer medium. In Fig. 4 there is shown a dashpot device in which the buffer medium is some viscous fluid such as oil, glycerine, etc. In this form of dashpot device two parallel cylindrical chambers are provided as shown at 35 and 36 which have communication with each other through a passage 37 formed in the casing wall, preferably at the bottom. This passage is conveniently controlled by means of an adjustable screw 38 shown projecting thereinto for regulating the movement of the viscous fluid through this passage from one chamber to the other. The chambers 35 and 36 are provided with reciprocating plungers 40 and 41 respectively, which are connected by an equalizing lever 42 pivoted to a fixed point at 43 midway between its pivotal connections with the plungers. In consequence of this connection, there is, for a given movement of one plunger, an equal and opposite movement of the other with consequent equal displacements of viscous fluid from one chamber to the other. This form of dashpot device could readily be used instead of the form shown in Fig. 3, as the means for damping the transmission of transient fluctuation to the pointer 11 in the combination. The connection to the motion-transmitting mechanism is effected in the same manner as in Fig. 1; a link shown at 45 in Fig. 7 connects the end of lever 42 to the end 15 of the Bourdon tube.

Figure 5:
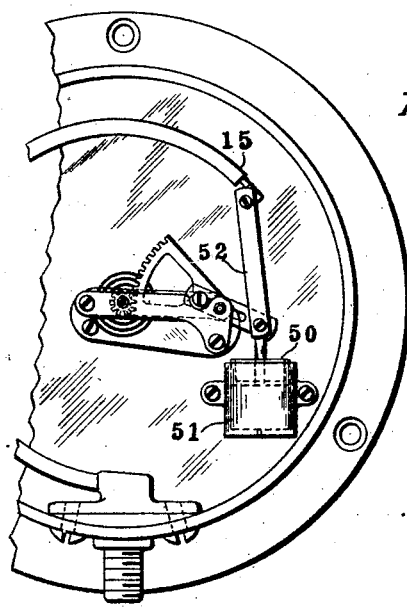
Figs. 5, 6 and 7 show further modifications in the relative arrangement of dashpot device when employed in combination with pressure gauges in accordance with this invention.

In one aspect of this invention however any suitable means for damping vibrations or the transmission of transient fluctuations to the movable indicating member may be used instead of the dashpot devices here illustrated, and that in the practice of this invention the dashpot device need not be connected to the motion multiplying lever, since it can very readily be connected directly to the end 15 of the Bourdon tube as shown in Fig. 5, where the plunger 50 of the dashpot device 51 is directly connected to the link 52 which actuates the multiplying lever of the motion-transmitting connections shown.

Figure 6:
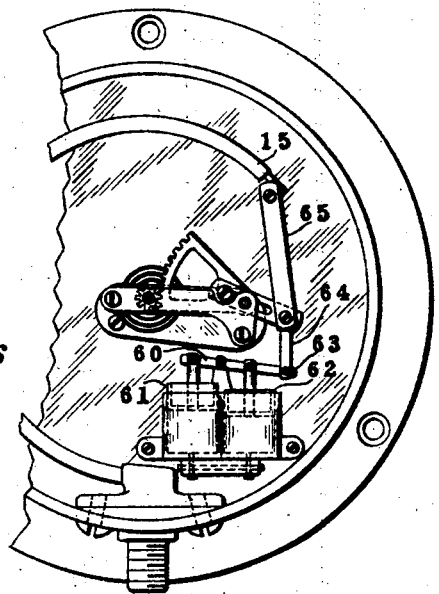

This latter mode of connection is equally applicable to the form of dashpot device shown in Fig. 4, as illustrated in Fig. 6, where the lever 60 oscillated by the plungers 61 and 62 of the dashpot device has its end 63 connected by an intermediate link 64 with the main link 65 for transmitting the motion of the end of the Bourdon tube or other condition-responsive element to the motion-transmitting connections.

The expression "transient fluctuation" as herein used is intended to include any vibration of the indicating member due to external causes, and also movements due to rapid or minor changes in the condition to be indicated which it is not material to ascertain, such as it is usually desirable to have the indicating device average up or may transpire at a rate too rapid for the eye readily to discern, so that it is in the interests of precision and desirable to read as a single average indication. Such quick periodic type of fluctuations occur in practice when the pressure condition is to be read from gauges connected to a steam-pump, hydraulic-pump, or stationary air compressor. The use of this invention in connection with indicating devices designed for such duty not only avoids the uncertainty of the readings heretofore incident to fluctuating changes in the condition to be indicated, but avoids the possible annoyance from and injury to the indicating device which may arise when the pointer is suddenly brought up against the stop placed generally at the zero point on the dial. Such sudden stoppage of the pointer not infrequently has resulted in the pointer being shifted on its spindle thus changing the accuracy of the instrument while at other times this resulted in the pointer's being bent or broken.

The dashpot device of this invention is therefore seen to be a means for damping the transmission of the transient fluctuations to the movable indicating member, and in consequence functions in the indicating device to effect an averaging up of the magnitude of the indications which would otherwise be given, the pointer 11 being at all times relatively still so that the eye can readily ascertain its real position and hence get an accurate reading; the indicating device, in the parlance of the mechanic, thereby being rendered "anti-fluctuating."

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A pressure indicating device comprising a movable index, a pressure responsive element, a damping device, and motion multiplying connections operative throughout the entire range of movement of the pressure responsive element for transmitting movement from the latter to the index and to the damping device.

2. A pressure indicating device comprising a movable index, a pressure responsive element, a dash pot having a piston, and connections operative throughout the entire range of movement of the pressure responsive element to transmit such movement to the dash pot piston and to the index.

3. A pressure indicating device comprising a movable index, a Bourdon tube, connections between the tube and index comprising a sector, a dash pot having a piston, and means for transmitting movements of the sector to the piston.

4. A pressure indicating device comprising a casing containing gaseous fluid, a movable index within the casing, a pressure responsive element, a damping device having a moving part, and means operative throughout the entire range of movement of the pressure responsive device for transmitting movement from the latter to the index and to the damping device.

5. A pressure indicating device comprising a casing containing gaseous fluid, a movable index within the casing, a pressure responsive element, a damping device comprising a piston and cylinder, one of said last-named parts being fixedly supported within the casing, and means for transmitting movement from the pressure responsive element to the index and to the moving part of said damping device.

6. A pressure indicating device comprising a casing containing air, a movable index therein, a pressure responsive element, a dashpot within the casing having a fixed cylinder and a movable piston, and means operative throughout the entire range of movement of the pressure responsive element for transmitting movement from the latter to the index and to the piston.

7. A pressure indicating device comprising a movable index, a Bourdon tube, a pair of dash pots each having a piston, a lever connected at points upon opposite sides of its fulcrum to the respective pistons, and means operative throughout the entire range of movement of the Bourdon tube for transmitting such movement to the index and to said lever.

8. A pressure indicating device comprising a Bourdon tube, a movable index, connections for transmitting movement of the tube to the index including a pivoted sector, a pair of dash pots each having a piston, a lever connected to each of said pistons, and means connecting the lever to the sector whereby the lever is constrained to move with the sector throughout the entire range of movement of the latter.

In testimony whereof I affix my signature.

OTTO W. HEISE.